June 6, 1961 M. LANG 2,987,569
WAFER-TYPE CELLS FOR DRY BATTERIES AND METHOD FOR MAKING SAME
Filed Oct. 12, 1954 2 Sheets-Sheet 1
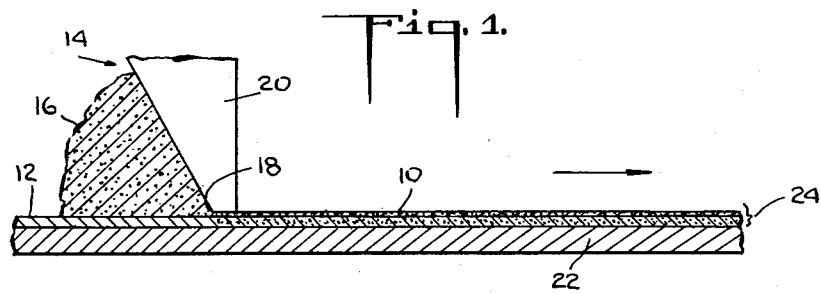
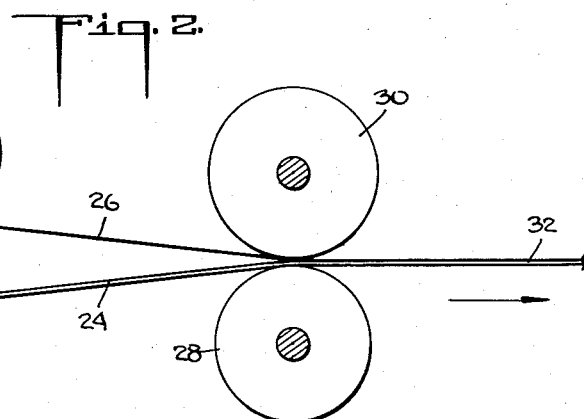
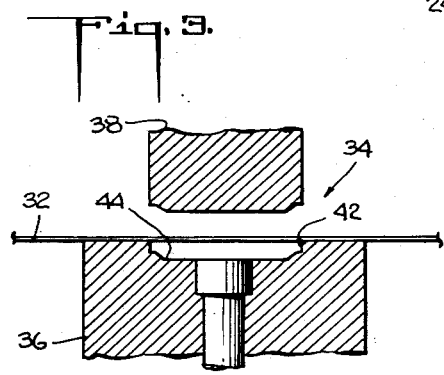
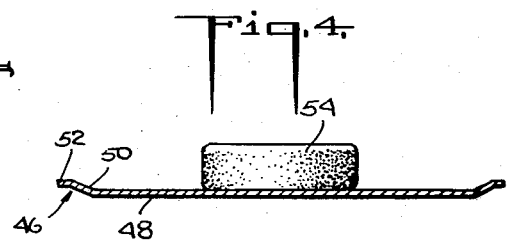
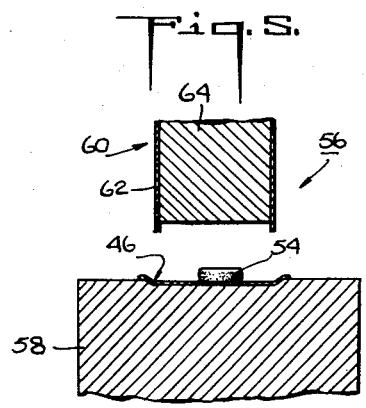
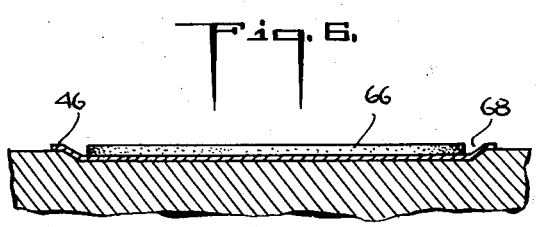
INVENTOR.
MAURICE LANG
BY
ATTORNEY June 6, 1961 M. LANG 2,987,569
WAFER-TYPE CELLS FOR DRY BATTERIES AND METHOD FOR MAKING SAME
Filed Oct. 12, 1954 2 Sheets-Sheet 2
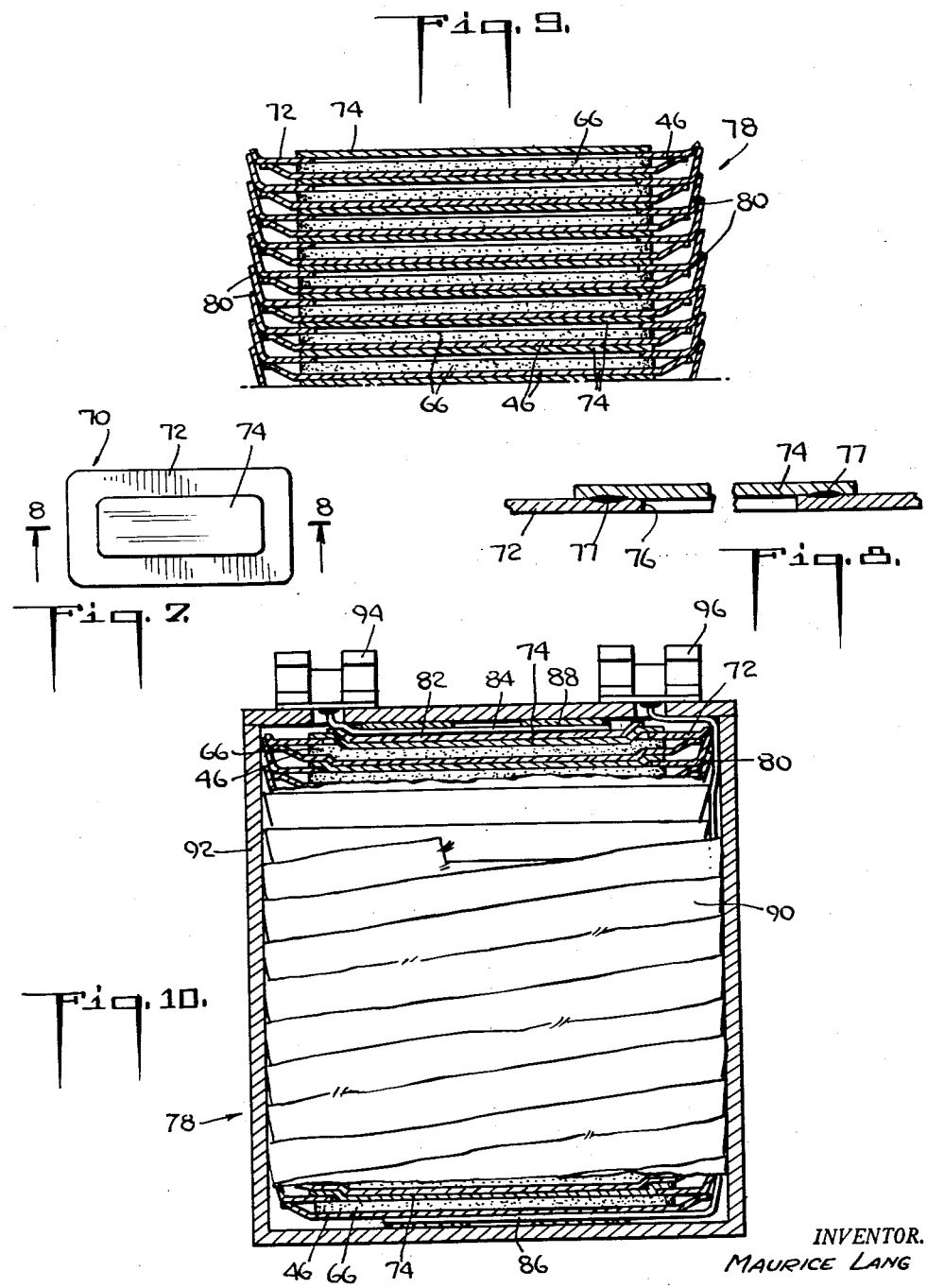
INVENTOR.
MAURICE LANG United States Patent Office 2,987,569
Patented June 6, 1961

2,987,569
WAFER-TYPE CELLS FOR DRY BATTERIES AND METHOD FOR MAKING SAME
Maurice Lang, Long Beach, N.Y., assignor to United States Electric Mfg. Corp., New York, N.Y., a corporation of New York
Filed Oct. 12, 1954, Ser. No. 461,732
4 Claims. (Cl. 136—111)

This invention relates to wafer-type cells for dry batteries and to a method for making the same.

By the term "wafer-type cell" there is denoted a light weight very thin cell, i.e., a cell whose height is in the neighborhood of from about 0.025" to about 0.050". The diameter of such a cell usually is about 1½", although this dimension is not important. These cells are employed where high voltages or high current drains or a combination of the two are needed momentarily, that is to say, for up to a few minutes. Through the use of wafer cells a primary battery with a large number of cells will occupy a comparatively small space and have a comparatively slight weight, it being appreciated that with the minimum thickness mentioned, 40 cells stacked in series with an overall height of an inch will yield about 60 volts.

By way of comparison, a conventional flashlight cell is about 2¼" high. A conventional flat-type plate battery cell has a thickness varying from ⅛ to ¼ of an inch. A wafer-type cell is only about 1/40 of an inch thick, this being a new and lower order of magnitude.

Up to the present time, no satisfactory wafer-type cell has been mass-produced or even proposed to be made at a price which is comparable to that of a plate-type battery cell. Moreover, wafer-type cells have heretofore deteriorated quickly.

It is an object of my invention to provide a wafer-type cell and method for making the same which is subject to neither of the foregoing disadvantages.

More specifically, it is an object of my invention to provide a wafer-type cell which can be made inexpensively and reliably in a mass production operation.

It is another object of my invention to provide a wafer-type cell of rugged construction which has a comparatively long shelf life.

It is an additional object of my invention to provide a wafer-type cell which can be produced at high speeds.

It is still another object of my invention to provide a wafer-type cell which lends itself to production methods that do not require the use of many skilled workers.

It is another object of my invention to provide a method for making wafer-type cells which can be practiced on a mass production basis and carried out with speed and accuracy.

Other objects of my invention in part will be obvious and in part will be pointed out hereinafter.

My invention accordingly consists in the features of construction, combinations of elements, arrangements of parts and series of steps which will be exemplified in the battery and method hereinafter described and of which the scope of application will be indicated in the appended claims.

In the accompanying drawings in which is shown one of the various possible embodiments of my invention, FIG. 1 is a sectional view through an apparatus for carrying out the first step in the preparation of a wafer cell, to wit, coating a bibulous strip with an electrolyte gel;

FIG. 2 is a sectional view through an apparatus for carrying out the second step in the preparation of said cell, to wit, duplexing the coated bibulous strip to a zinc sheet;

FIG. 3 is a sectional view through an apparatus for carrying out the third step in the aforesaid preparation, to wit, blanking and shaping a shallow cup from the duplexed stock;

FIG. 4 is a sectional view through the shallow cup after a mass of depolarizing mix has been deposited therein;

FIG. 5 is a sectional view through a set of dies for shaping the depolarizing mix in the cup;

FIG. 6 is a sectional view through the shallow cup after the depolarizing mix has been shaped;

FIG. 7 is a top plan view of the flexible carbon electrode employed in the cell;

FIG. 8 is a sectional view taken substantially along the line 8—8 of FIG. 7;

FIG. 9 is a vertical sectional view through a set of wafer cells arranged in a stack preparatory to forming a battery therefrom; and FIG. 10 is a vertical sectional view through the finished battery.

Referring now in detail to the drawings and more particularly to FIG. 1, the first step in the preparation of a wafer-type cell embodying my invention constitutes applying an electrolyte gel as a coating 10 to a bibulous strip 12 which is chemically and physically inert to the ingredients present in the cell. A paper which I have found to be satisfactory is a very thin, e.g. 0.001 or 0.002 inch, unsized sulfite paper, this being a highly absorbent paper.

The coating can be applied in any well-known fashion. Conveniently, it may be deposited by a hopper 14 containing a mass 16 of electrolyte gel in sufficiently fluid form to pass through the hopper throat 18, the thickness of the coating being regulated by the height of a doctor blade 20 above the paper and the speed of travel of the paper strip 12. Said strip is moved to, under and past the doctor blade on a conveyor belt 22. If it is desired to flow a gel in a somewhat viscous state, it can be maintained in the hopper under pressure.

Satisfactory gel compositions are conventional. A typical composition includes zinc chloride, ammonium chloride, a gelling agent such as starch or flour, and water. I prefer to employ as little water as possible. However, when the coated strip is used in the second step of my process it is preferable to have the layer of electrolyte gel damp enough for it to be tacky and thus ready to adhere to a metal surface. It also is desirable to have water in the electrolyte gel in order to encourage penetration of the gel into the paper strip and into the mix cake hereinafter described in order thereby to complete the circuit between the two electrodes of the cell.

It will be understood that although I have illustrated and described in some detail a particular method for coating the paper strip with an electrolyte gel, I do not wish to be limited thereto and may employ other known coating procedures for this purpose, as for instance dipping, brushing, spraying or rolling.

The coated paper strip 24 is secured, i.e. duplexed, to a thin zinc sheet 26, the coated side of the strip facing the zinc sheet whereby the tacky properties of the electrolyte gel will cause adherence between these two thin flat members. Desirably the duplexing is carried out continuously by passing the strip 24 and sheet 26 between a pair of pressure rolls 28, 30. The zinc sheet can be unwound from a supply roll and the coated strip fed directly from the coating apparatus after partial drying, if necessary, in a baking oven.

Alternatively, the duplexing can be effected by laying the coated strip on the zinc sheet and optionally thereafter pressing the two sheets together either manually, or with a hand roller, or with a press.

The duplexed stock 32 either is rolled up or passed directly from the duplexing apparatus to a blanking and forming mechanism 34. Said mechanism may constitute a pair of coacting shaped rolls but in the form of my invention shown herein comprises a set of two dies that are adapted to be fitted in a reciprocating press. These dies include a stationary member, i.e., anvil, 36 and a reciprocating member, i.e., plunger, 38. The anvil is provided with a shallow depression having perpendicular side walls 42 to carry out a shearing, i.e., blanking, operation in conjunction with the plunger. The depression further comprises a bottom wall 44 whose shape matches the contour to be imparted to the underside of a cup 46 formed from the composite stock 32.

The lower or working end of the plunger 38 is shaped to match the upper surface of the cup 46.

The stock 32 is intermittently fed between the dies when the same are in open position and is halted to permit the dies to close. The dies first will shear a blank from the stock and in the same stroke form the stock to the desired shape.

This shape includes a flat broad base wall 48 having upwardly sloping peripheral sides 50. These sides terminate in a flange 52 which surrounds the cup and is parallel to the wall 48. The angle between the sides 50 and base wall 48 desirably is comparatively small and preferably does not exceed 45°. Moreover, the vertical spacing between the flange 52 and base wall 48 is comparatively slight being in the order of $\frac{1}{50}$ of an inch. The preferable width of the sides 50 is from $\frac{1}{16}$ to $\frac{1}{32}$ of an inch.

It thus will be appreciated that when the cup 46 is formed from the blank it is cut out of the composite stock and no lengthy drying stage is necessary. This is in contrast to the drying operation conventionally performed on zinc cups for flashlight cells and plate battery cells.

It further will be understood that the steps of coating the paper sheet, duplexing the sheet to zinc and blanking and shaping the cup 46 can be carried out at high speeds and low cost and does not require considerable manual attention. Moreover, the forming operation is so mild that the paper is not broken and can be successfully shaped in the same operations as the zinc sheet.

The cup 46 has deposited therein a mass 54 of a depolarizing mix.

A typical depolarizing mix composition includes a predominant portion of manganese dioxide to act as the depolarizer, some ammonium chloride and zinc chloride which in combination with water function as an electrolyte, these electrolytes permeate the mass, and small proportion of a conductor as, for example, carbon black or graphite to increase the electrical conductivity of the mass and thereby decrease the internal resistance of the cell. These materials are thoroughly mixed and are damped, for example with 10% of their weight of water, so as to render the composition somewhat plastic. Thereafter, the composition is shaped into a suitable contour, for instance, a squat cylinder with a diameter of about 0.4" and a height of about 0.1". The cylinder is deposited at the center of the cup.

Alternatively, I may shape the plastic depolarizing composition into any form whatsoever, press the same under substantial pressure, e.g., 1000 lbs. per square inch, and then granulate the composition to a particle size larger than those of the original particles whereby to provide a particulate mass consisting of prepressed tiny portions. A typical size for the particles is from about 60 to about 40 mesh. The amount of composition contained in the preform 54 or in the particulate mass deposited in the cup is such that if properly shaped, it will almost fill the cup flush.

In accordance with one of the principal features of my invention the preform or particulate mass, both of which are substantially dry, are pressed to flow the same under pressure in a cold (unheated) dry state almost to the boundaries of the cup and thereby substantially fill the same. This method of distributing the mix composition is very rapid and accurate and leaves the cell particularly clean.

A machine 56 for pressing out the mix cake is shown in FIG. 5. Said machine includes an anvil 58 which is shaped to receive and support the underside of the cup 46 and a two-part plunger 60. The outer plunger part 62 is hollow to slidably accommodate the inner part 64. The periphery of said outer part substantially matches the periphery of the base wall 48 of the cup, exclusive of the sloping sides 50. Said outer part is thin so that the inner part is substantially of the same shape and size, although slightly smaller than the base wall of the cup.

In the operation of the machine 56 a cup 46 is placed on the anvil 58 with a mass 54 of the depolarizing mix located at about the center of the bottom wall of the cup. The plunger 60 is in its upper position. The mechanism then is actuated causing the plunger to descend. The two parts are so driven, e.g. by separate cams, that the outer part 62 leads the inner part 64 and first will engage the bottom wall of the cup 46, but thereafter said part 62 remains seated against the bottom wall while the inner part continues its downward movement. The inner part moves downward far enough to compress and thereby cause cold flow of the material of the depolarizer preform outwardly until it contacts the inner surface of the outer part 62. At this time the thickness of the depolarizing cake will have been reduced to its desired ultimate size.

During such flow the outer part 62 acts as a retainer ring to limit and define the periphery of the mix cake.

Once the mix cake has been formed, the cam driving the inner parts, lift said parts slightly, e.g. about one-thousandths of an inch, to relieve pressure on the mix cake. Thereafter, the outer part is raised and finally the inner part is lifted clear of the mix cake. This sequence, that is to say, raising the retainer ring before the plunger, prevents undue suction from disturbing the shape of the mix cake.

The shape and location of the mix cake 66 after forming is illustrated in FIG. 6. It there will be seen that its upper surface is substantially flush with the upper surface of the flange 46 and that the periphery of the cake is just short of the periphery of the base wall 48 whereby to leave a narrow air space 68 which in the main constitutes the interior of the cup above the sides 50.

It will be appreciated that this method of forming the mix cake under pressure in situ accurately locates the cake, insures the pressure of a proper amount of depolarizer and prevents contamination of any of the other parts. It has the further advantage of providing a good electrical and mechanical bond between the mix cake and the electrolyte soaked paper 12, thereby further reducing the internal resistance of the cell and enabling the cup and cake to be handled without fear of breaking the otherwise fragile cake.

Each cell includes a flexible carbon electrode 70. Said electrode comprises a flexible carrier 72 and a flexible carbonaceous sheet 74. Preferably the carrier 72 is thermoplastic and thereby autogenously weldable to a sheet of compatible material under the influence of heat and pressure. Said carrier is fabricated from sheet material, a suitable substance being a polyvinyl chloride. The shape of the carrier conveniently may be substantially the same in plan contour as that of the cup. However, its periphery is larger so that when laid on the cup will extend beyond the borders thereof. Said carrier is provided with a large central opening 76 which may have the same shape as the mix cake but is slightly smaller.

The flexible carbonaceous sheet 74 preferably is made in accordance with my United States Letters Patent No. 2,664,453 for Batteries, dated December 29, 1953, and owned by the assignee of the present application. Essentially said sheet is flexible and water impermeable and includes a coherent sheet of a fibrous liquid permeable material such as cloth or unglazed paper impregnated from face to face with an imperforate coherent layer of a thermoplastic carrier, e.g. polymerized vinyl chloride, which is coextensive with the sheet and fills the interstices thereof. The polyvinyl chloride has carbonaceous particles of a graphitic nature, for example graphite or carbon black, uniformly and heavily distributed therethrough, the particles being present preferably in an amount by weight equal to the amount of thermoplastic material so that the impregnated sheet has a low electrical resistance.

The flexible carbonaceous sheet 74 is disposed on the flexible carrier 72 over the central opening 76 and is sufficiently large to completely cover the same. The sheet 74 and carrier 72 are joined permanently to one another around the central opening by a water-tight seal 77. This can be accomplished suitably by autogenously welding the sheet and carrier to one another under heat and pressure.

A single unit cell comprises a duplexed cup 46 containing a mix cake 66 and overlaid by a flexible carbon electrode 70.

A battery 78 comprises a pack, i.e. a stack, of unit cells, that is to say, a series of mix cake containing cups between which flexible carbon electrodes are interleaved. Due to the dimensions of the flexible carriers 72, the peripheries thereof extend beyond the peripheries of the duplexed cups in the stack. The extending portions of adjacent flexible carriers are sealed to one another as at 80, in a water-tight manner, e.g. by autogenous welding. Thus each cup containing a mix cake is isolated from adjacent cups, the only connection being through the juxtaposed carbon electrodes.

A typical battery after sealing of the carriers has the appearance shown in FIG. 9. Desirably, during the aforementioned sealing, the extending portions of the carriers are folded to lie against the stack of cups and are held in this position by the seals.

In a finished battery (see FIG. 10), a zinc plate 82 is placed on top of the uppermost carbon electrode and a wire 84 is soldered to it. Another wire 86 is soldered to the lowermost zinc cup. The stack of cells is compressed and thereafter is held under pressure by vertically encircling tapes 88. The sides of the stack are reinforced by a horizontally encircling tape 90 which, after wrapping may be dipped in wax. The wrapped stack is enclosed in a waterproof paper container 92. Terminals 94, 96 are applied to the free ends of the wires 84, 86.

It thus will be seen that I have provided a wafer-type cell for dry batteries and a method for making the same which achieve the various objects of my invention and are well adapted to meet the conditions of practical use.

As various possible embodiments might be made of my invention and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. A wafer-type Leclanché cell the height of which does not exceed about 0.050 inch, said cell constituting a shallow flanged zinc cup electrode, the cupped portion whereof includes side walls and a base, and an electrolyte-impregnated bibulous liner adhered to the entire upper surface of the cup electrode, a mix cake formed under pressure in situ entirely within the periphery of the cupped portion of the electrode, and a flexible carbon electrode overlying the cup, said carbon electrode consisting of a flexible electrically non-conductive plastic carrier sheet having a central flexible carbonaceous portion.

2. In a wafer-type Leclanché cell, a shallow flanged zinc cup electrode, the height of which does not exceed 0.050 inch, the cupped portion of said electrode including a base and side walls, said side walls being outwardly inclined at an angle not exceeding 45° to the flange, an electrolyte-impregnated very thin bibulous liner adhered to the entire upper surface of the cup electrode, and a mix cake entirely within the periphery of the cupped portion of the electrode, the periphery of the mix cake being spaced inwardly from the side walls of the cupped portion of the zinc electrode whereby to provide an annular space between said side walls and mix cake.

3. In a method of making a wafer-type Leclanché cell wherein a bibulous liner is applied to a layer of zinc, wherein a depolarizing mix is applied to the liner, and wherein a carbonaceous sheet is applied to the depolarizing mix, that improvement including the steps of applying an electrolyte to a very thin bibulous layer so as to impregnate the same, placing the impregnated layer on a flat layer of zinc sheet metal, then pressing the two layers together whereby to form composite flat stock with the impregnated layer duplexed to the zinc layer, thereafter blanking out from said composite stock a flanged shallow cup zinc electrode having the entire upper surface thereof covered with the bibulous material, then placing a mass of depolarizing mix in the cup on the liner, and thereafter forming the mass under pressure in situ into a mix cup entirely within the periphery of the cupped portion of the electrode.

4. In a method of making a wafer-type Leclanché cell wherein a bibulous liner is applied to a layer of zinc, wherein a depolarizing mix is applied to the liner, and wherein a carbonaceous sheet is applied to the depolarizing mix, that improvement including the steps of applying an electrolyte to a very thin bibulous layer so as to impregnate the same, placing the impregnated layer on a flat layer of zinc sheet metal, then pressing the two layers together whereby to form composite flat stock with the impregnated layer duplexed to the zinc layer, thereafter blanking out from said composite stock a flanged shallow cup zinc electrode having the entire upper surface thereof covered with the bibulous material, and then placing a mix cake on the upper surface of said electrode entirely within the periphery of the cupped portion thereof while maintaining the sides of the cup separated by a narrow open space from the sides of the mix cake.

References Cited in the file of this patent

UNITED STATES PATENTS

| | | |
|---|---|---|
| 2,307,764 | Deibel et al. | Jan. 12, 1943 |
| 2,416,576 | Franz et al. | Feb. 25, 1947 |
| 2,427,576 | Ruben | Oct. 31, 1950 |
| 2,521,800 | Martinez et al. | Sept. 12, 1950 |
| 2,526,692 | Ruben | Oct. 24, 1950 |
| 2,664,453 | Lang | Dec. 29, 1953 |
| 2,666,802 | Woodring et al. | Jan. 19, 1954 |
| 2,672,498 | Temple | Mar. 16, 1954 |

FOREIGN PATENTS

| | | |
|---|---|---|
| 299,784 | Great Britain | Oct. 31, 1929 |
| 506,138 | Belgium | Oct. 15, 1951 |
| 162,413 | Australia | Nov. 6, 1952 |